US007962436B2

(12) United States Patent
Brelage et al.

(10) Patent No.: US 7,962,436 B2
(45) Date of Patent: Jun. 14, 2011

(54) ENHANCED CALL-BACK SERVICE USING RULE ENGINE

(75) Inventors: Christian Brelage, Muenster (DE); Thorsten Sandfuchs, Karlsruhe (DE); Carsten Ziegler, Walldorf (DE)

(73) Assignee: SAP AG, Walldorf (DE)

( * ) Notice: Subject to any disclaimer, the term of this patent is extended or adjusted under 35 U.S.C. 154(b) by 777 days.

(21) Appl. No.: 12/039,187

(22) Filed: Feb. 28, 2008

(65) Prior Publication Data
US 2009/0222394 A1    Sep. 3, 2009

(51) Int. Cl.
*G06F 17/00*    (2006.01)
*G06N 5/02*    (2006.01)
*G06N 7/00*    (2006.01)
*G06N 7/08*    (2006.01)

(52) U.S. Cl. ............................................. 706/47; 706/59
(58) Field of Classification Search ........................ None
See application file for complete search history.

(56) References Cited

U.S. PATENT DOCUMENTS

| | | | | |
|---|---|---|---|---|
| 5,774,661 | A * | 6/1998 | Chatterjee et al. | 709/203 |
| 6,473,748 | B1 * | 10/2002 | Archer | 706/45 |
| 6,611,590 | B1 * | 8/2003 | Lu et al. | 379/265.09 |
| 6,993,514 | B2 * | 1/2006 | Majoor | 706/47 |
| 7,020,869 | B2 * | 3/2006 | Abrari et al. | 717/108 |
| 2004/0064343 | A1 * | 4/2004 | Korpman et al. | 705/2 |
| 2004/0215586 | A1 * | 10/2004 | Koono et al. | 706/45 |
| 2005/0091357 | A1 * | 4/2005 | Krantz et al. | 709/223 |
| 2008/0052308 | A1 * | 2/2008 | Zhang | 707/102 |
| 2008/0320552 | A1 * | 12/2008 | Kumar et al. | 726/1 |
| 2010/0031232 | A1 * | 2/2010 | Glazier et al. | 717/106 |
| 2010/0146243 | A1 * | 6/2010 | Balko et al. | 712/33 |
| 2010/0257604 | A1 * | 10/2010 | Zhou et al. | 726/22 |

OTHER PUBLICATIONS

Bhatti, N. et al.; "Object Serialization and Deserialization Using XML"; 2000 McGraw-Hill Publishing Company Ltd.; 10 pages.*
Extended European Search Report for Application No. EP 09001691.6, dated May 28, 2009, 6 pages.
XP002456252, Statement in accordance with the Notice from the European Patent Office dated Oct. 1, 2007 concerning business methods (OJ EPO Nov. 2007, 592-593), 1 page.

* cited by examiner

*Primary Examiner* — Michael B Holmes
*Assistant Examiner* — Stanley K Hill
(74) *Attorney, Agent, or Firm* — Fish & Richardson P.C.

(57) ABSTRACT

An enhanced call-back service, in which a local rule engine is caused to be capable of invoking a rule defined at an external rule engine, and a function provided by the local rule engine is exposed as a call-back service. At the call-back service and from the external rule engine, a request to interact with the function is received, and, using the call-back service, an interaction is provided between the external rule engine and the function.

18 Claims, 12 Drawing Sheets ic # ENHANCED CALL-BACK SERVICE USING RULE ENGINE

FIELD

The present disclosure generally relates to process modeling.

BACKGROUND

A rule engine allows the execution logic of a process to be modeled in a straightforward and declarative manner. For example, a business rule engine processes the execution logic of a business process. In order to achieve higher agility and flexibility, business rule management systems (BRMSs) separate business-related application logic from other types of application logic, so that changes to business process models are easier to implement and do not necessarily require specialized programming skills. These BRMSs are used, for example, in public sector, financial, and insurance contexts.

SUMMARY

According to one general implementation, close coupling of local and external rule engines may be enabled by allowing a call-back service to orchestrate access by the external rule engine to functions or services provided by the local rule engine (or by back-end systems accessed via the local rule engine). Such access may be useful in a variety of business contexts.

According to another general implementation, a computer-implemented process includes causing a local rule engine to be capable of invoking a rule defined at an external rule engine, and exposing a function provided by the local rule engine as a call-back service. The process also includes receiving, at the call-back service and from the external rule engine, a request to interact with the function, and providing, using the call-back service, an interaction between the external rule engine and the function.

Implementations may include one or more of the following features. For example, the local rule engine may be caused to be capable of invoking the rule defined at the external rule engine based on transmitting a schema document that defines an input to and an output of an external rule engine to the external rule engine. The call-back service may be a web service.

In further examples, the process may further include registering a schema document that binds the function with a data type, where the function may be a look-up function. During a design time of the external rule engine, receiving the request to interact with the function may further include receiving a request for a list of look-up functions provided via the call-back service. Providing the interaction may further include transmitting, to the external rule engine, a response providing the list of look-up functions including the function. During a run-time of the external rule engine, receiving the request to interact with the function may further include receiving, from the external rule engine, a request for instance data, the request identifying the schema document, the function, and a parameter. Providing the interaction may further include transmitting, to the external rule engine, the instance data resulting from processing the request using the function.

In additional examples, during a design time of the external rule engine, receiving the request to interact with the function may further include receiving a request for a list identifying pre-defined data types used by the function. Providing the interaction further may further include transmitting, to the external rule engine, a response providing the list of pre-defined data types used by the function. During a run-time of the external rule engine, receiving the request to interact with the function further comprises receiving, from the external rule engine, a request for instance data associated with an identified data type on the list identifying pre-defined data types. Providing the interaction may further include transmitting, to the external rule engine, the instance data associated with the identified type.

In other examples, the function may be a conversion function. During a design time of the external rule engine, receiving the request to interact with the function may further include receiving a request for a list of conversion functions provided via the call-back service. Providing the interaction may further include transmitting, to the external rule engine, a response providing the list of conversion functions including the function. During a run-time of the external rule engine, receiving the request to interact with the function may further include receiving, from the external rule engine, a request for instance data, the request identifying the function, a source unit identifier, and a data value. Providing the interaction may further include transmitting, to the external rule engine, the instance data resulting from processing the request using the function.

In still further examples, the function may be a log execution trace function, and, during a run-time of the external rule engine, receiving the request to interact with the function may include receiving, from the external rule engine, a request identifying a previously received call from the local rule engine to the external rule engine, and an execution trace logging execution of the call. Providing the interaction may further include storing the received execution trace at the local rule engine.

In additional examples, the process may further include registering the function with the call-back service, the function provided by the local rule engine comprises an internal local rule engine function or an external back-end function implemented by a back-end system. During a design time of the external rule engine, receiving the request to interact with the function may further include receiving a list of functions registered with the call-back service. Providing the interaction may further include transmitting, to the external rule engine, a response providing the list of functions including the external back-end function. During a run-time of the external rule engine, receiving the request to interact with the function may further include receiving, from the external rule engine, a back-end call. Providing the interaction may further include passing the back-end call to the back-end system, and transmitting, to the external rule engine, a response resulting from processing the back-end call using the external back-end function.

In an alternative example, during a design time of the external rule engine, receiving the request to interact with the function may further include receiving a list of functions registered with the call-back service. Providing the interaction may further include transmitting, to the external rule engine, a response providing the list of functions including the internal local rule engine function. During a run-time of the external rule engine, receiving the request to interact with the function further comprises receiving, from the external rule engine, a local rule engine call. Providing the interaction may further include passing the local rule engine call to the local rule engine, and transmitting, to the external rule engine, a response resulting from processing the local rule engine call using the local rule engine function.

In another general implementation, a device includes a processor configured to cause a local rule engine to be capable of invoking a rule defined at an external rule engine, and to expose, as a call-back service, a function provided by the local rule engine. The processor is further configured to receive, at the call-back service and from the external rule engine, a request to interact with the function, and provide, using the call-back service, an interaction between the external rule engine and the function.

In a further general implementation, a computer program product is tangibly embodied in a machine-readable medium. The computer program product includes instructions that, when read by a machine, operate to cause data processing apparatus to cause a local rule engine to be capable of invoking a rule defined at an external rule engine, to expose, as a call-back service, a function provided by the local rule engine, to receive, at the call-back service and from the external rule engine, a request to interact with the function, and to provide, using the call-back service, an interaction between the external rule engine and the function.

The details of one or more implementations are set forth in the accompanying drawings and the description, below. Other features and advantages of the disclosure will be apparent from the description and drawings, and from the claims.

DETAILED DESCRIPTION

Close coupling of local and external rule engines may be enabled by allowing a call-back service to orchestrate access by an external rule engine to functions or services provided by the local rule engine (or by back-end systems accessed via the local rule engine). Such access may be useful in a variety of business contexts.

A business process refers to a series of business tasks or activities executed in a coordinated order. Applications allow business processes that span multiple functional areas to be modeled using business objects and functions that are processed by a local business rule engine.

A task refers to the atomic business process component that describes an activity or alters a business process's control flow, for instance by splitting or joining the business process flow. An exemplary business process may include a dedicated begin task, and sequentially executed first through third tasks that each occur prior to the dedicated end task. The execution of certain tasks may require the invocation of an external business rule engine that provides partner-supplied functionalities or logic.

Under these circumstances, the local business rule engine (also referred to herein as a primary or proprietary business rule engine, a 'Formula & Derivation Tool' (FDT), or a Business Rules Framework (BRF) Plus, or BRFplus) may be integrated with external or third party business rule engines (or third party BRMSs). For instance, an entity may wish to access a pre-configured third party payroll accounting rule set that is provided or optimized for a specific platform or application. By describing these other business rule engines as 'external,' it is merely intended that these engines are distinct from the primary or local business rule engine. Thus, a business rule engine may be referred to as 'external' even if it is executing on the same machine as the local business rule engine, or is associated with the same operator as the local business rule engine.

Figure 1:
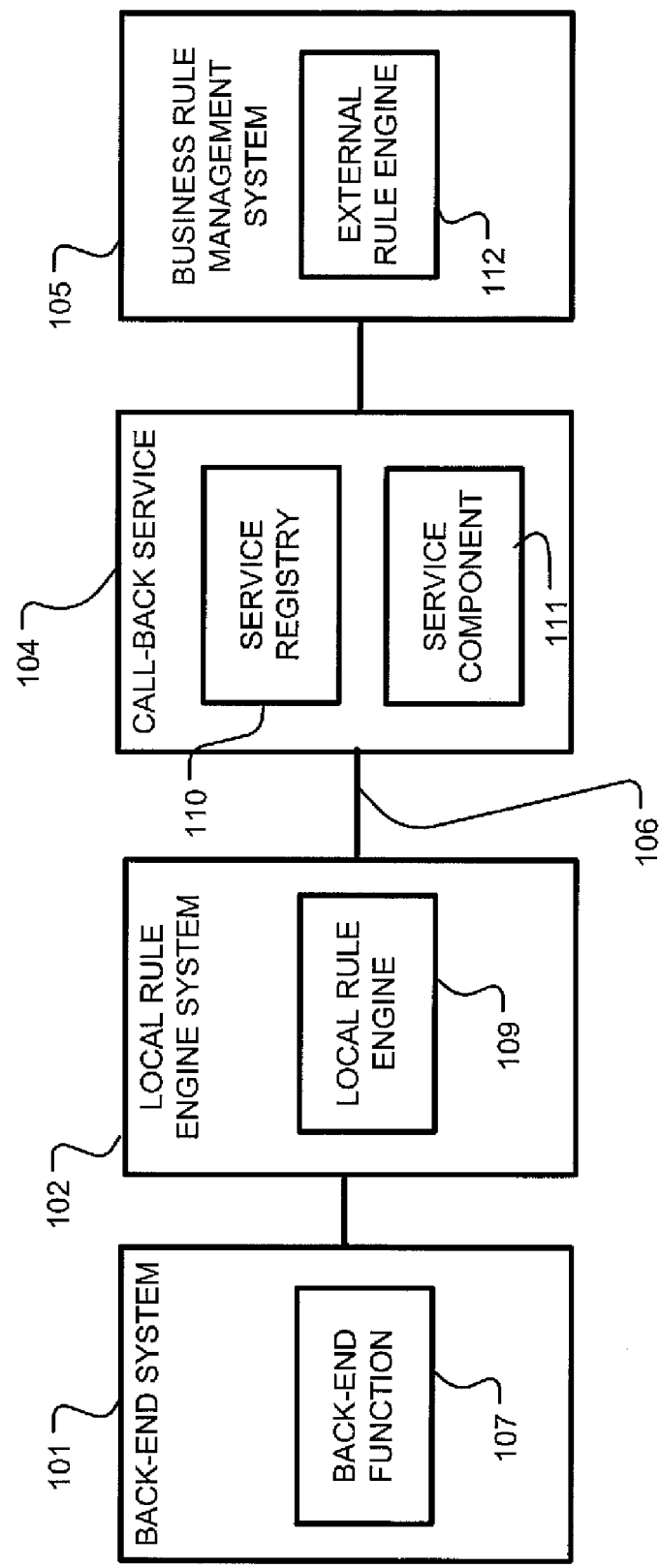
FIGS. 1 and 4 are block diagrams of exemplary systems that implement an enhanced call-back service.

FIG. 1 is a block diagram of an exemplary system 100 that implements an enhanced call-back service. Briefly, the exemplary system 100 includes a back-end system 101, a local rule engine system 102, a call-back service 104, and a BRMS 105, connected by way of at least one network 106.

The back-end system 101 may be any system that implements a back-end function 107, such as an enterprise system or other company-internal system. The local rule engine system 102, which may implement the SAP® NETWEAVER® FDT or BRFplus, includes a local rule engine 109 that defines and processes business rules and that outputs data using a comprehensive application programming interface (API). The local rule engine 109 is a hardware or software module that manages and automates business rules.

The call-back service 104 may be exposed as a web service (as described by a Web Services Description Language, or "WSDL"), and includes a service registry 110 that catalogues the available services, and a service component 111 that implements a particular functionality, as the web service. The BRMS 105 includes an external rule engine 112 that also defines and processes business rules, and that outputs results of the external rule processing to the local rule engine system 102.

In one example configuration, the external rule engine 112 includes specialized, customized, proprietary, or protected (such as by patent or trade secret) business rules that the local rule engine 109 may wish to use or access, and the local rule engine 109 includes similar protected business rules that the external rule engine 112 may wish to use or access. In a financial context, the external rule engine may provide a credit scoring function which accepts inputs regarding a customer's credit history, such as annual income or recent payment delinquencies, and which outputs a credit score that rates the consumer against a pool of consumers. If the local rule engine system 102 is operated by a mortgage provider, the resulting credit score may be used to determine whether to grant a loan to a consumer.

In this example, the operator of the BRMS 105 may not want to release the credit scoring logic used by the external rule engine 112 to derive the credit score, to prevent entities from discovering weaknesses that might artificially inflate a person's credit score. At the same time, the operator of the local rule engine system 102 may not want a user of the local rule engine 109 to know that a credit score is being sought externally, or require a user to take any extra steps to access credit score data.

Thus, and using the enhanced approach described herein, the local rule engine 109 may seamlessly interface with the BRMS 105 by executing a function that is itself internal to the local rule engine system 102, but which includes an expression that calls the external rule engine 112. In the described example, the expression may call the external rule engine 112 by supplying context information that uniquely identifies a customer, in a format, structure or data type that is readily understood by the external rule engine based on an earlier-provided business vocabulary that assists, allows, causes or effects the definition of the external business rule.

The external rule engine 112 evaluates or processes the context using the rule, and provides result information (or, simply, a 'result' or a 'response') back to the local rule engine 109 in a format, structure or data type that is readily understood by the local rule engine 109. The result provided by the external rule engine 112 is parsed by the expression (or parse tree) of the local rule engine 109 associated with the called function, and an output of the function is returned to the user of the local rule engine system 102 based on the result.

In a similar manner, the BRMS 105 may itself use business rules stored, invoked, or executed in the local rule engine 109 or on the back-end system 101, and may also call these functions using internal expressions. Such calls and the concomitant responses may occur (and may thus be orchestrated) using the call-back service 104.

Thus, the function of the 'Formula & Derivation Tool' is to trigger processing of rule-based logic at the external rule engine 112 through the use of a place-holding expression that seamlessly invokes communication to an external rule engine. The 'derivation' of the 'Formula & Derivation Tool' refers to a parse tree (or expression tree) that provides for the parsing of contextual input. For example, the derivation may be as sequence of statements (such as in logic or mathematics) indicating that a result is a natural consequence of previously accepted statements.

In a similar regard, an expression may thus be any combination of values, functions, tokens, atoms, and procedures, interpreted according to the particular rules of precedence and of association for a particular expression type, which computes and then returns another value. Similarly, an expression type describes the rules of precedence and association for a defined context. For each application executing a particular business process, filters may restrict the use of certain expression types, expressions, or functions, in order to reduce the quantity of available objects in a given scenario.

As inferred above, the input to a function or expression is referred to as the 'context,' and the output (or return value) of an expression is referred to as a 'result.' Both the context and the result may include data elements such as fields, structures or tables, or a set of data objects such as a scalar value, a work area, or a vector value, where a scalar refers to a variable that holds one value at a time, and a vector is a collection of scalars.

In one example instance, a function that models a health insurance business rule may include an expression that accepts a table listing multiple patient names as input, or that accepts a single element indicative of a single patient name as input. This function may output an elemental data field indicating whether any of the patients named in the table are insured by an entity executing the business rule, or may output a table listing dates and descriptions of recent medical treatments. The 'rule' may thus be understood as an expression or hierarchy of expressions assigned to a particular function, such as an insurance fraud detection function, a credit scoring function, or other exemplary function. The specific rule applied to the input context may depend on the type, description, or structure of the input context.

In another example instance, 'business objects' are input into each business process, where business objects represent uniquely identifiable business components, entities, or data described by a structural model, an internal process model, or service interfaces. Example business object types include core or hosting business object (e.g. a purchase order, a customer invoice request, or a purchase order), replicated business objects (e.g. a planning view on a core business object such as a purchase order), a business object template (e.g. a maximal template of product with all attributes), a dependent business object (e.g. a reuse part of another business object such as an. address), a business foundation object (e.g. an object located in a foundation layer such as a business partner).

In contrast to a 'notion object,' a 'business object' describes an entity type and not necessarily the instance of the entity itself. Similarly, a dependent business object is a business object which is used (as a reuse part) in or by another business object, and which represents a concept that cannot stand by itself, from a business perspective. Although instances of dependent business objects may occur in the context of a business object, dependent objects are equivalent in terms of structure and functionality over a range of embedding objects.

Figure 2:
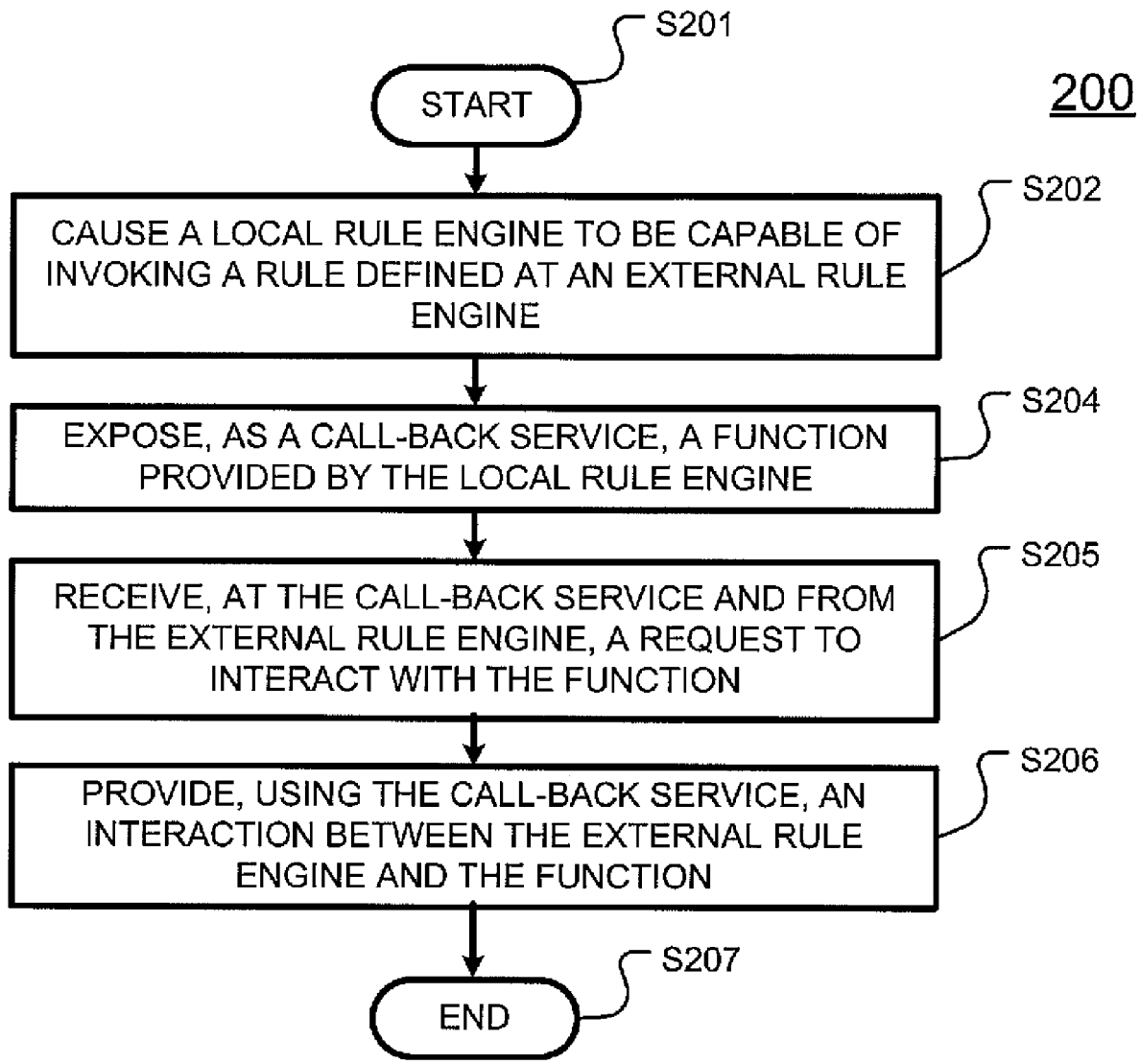
FIG. 2 is a flowchart illustrating a process for providing enhanced call-back service.

FIG. 2 is a flowchart illustrating a process 200 for providing enhanced call-back service, according to one general implementation. Briefly, the computer-implemented process 200 includes causing a local rule engine to be capable of invoking a rule defined at an external rule engine, and exposing a function provided by the local rule engine as a call-back service. The process also includes receiving, at the call-back service and from the external rule engine, a request to interact with the function, and providing, using the call-back service, an interaction between the external rule engine and the function.

In more detail, when process 200 begins (S201), a local rule engine is caused to be capable of invoking a rule defined at an external rule engine. According to one arrangement, and in order to exchange data with the external rule engine, the local rule engine first exchanges a vocabulary ("business vocabulary" or "BV") with the external rule engine, where the vocabulary provides the format, type, description or structure of the data to be exchanged between the local and external rule engines. The vocabulary allows, causes or effects the definition of rules at the external rule engine, such that input data (or 'contexts') received by the external rule engine is appropriately processed, and output data (or 'responses') are properly formatted and structured for the local rule engine. Based on this vocabulary exchange, rule-evaluated result data may be easily imported by the local rule engine and processed further.

The exchange of the BV allows for the invocation of remote functionality at the external rule engine by the local rule engine, and may also allow for the invocation of local functionality at the local rule engine by the external rule engine. Put another way, external invocation of functionality at other rule engines may be said to be orchestrated.

The vocabulary is automatically generated at the local rule engine during a design time phase, using context and result information. During a runtime phase (i.e. after the deployment or definition of the rule at the external rule engine), the local rule engine may invoke the deployed rule at the external rule engine by passing data (i.e. the context) to the external rule engine. Using the rule that was defined based on the expected context format, type, description or structure, the external rule engine receives and processes the context using the rule, and returns a resulting data set to the local rule engine, in the appropriate format.

In doing so, a business entity is better able to fulfill customer requirements, particularly in the public sector, insurance, and finance fields. Furthermore, functional gaps of local rule engines are filled, since leading BRMSs which utilize proprietary or specialized rule engines may still be used by the local rule engines. Thus, the user is not committed to a particular local rule engine, and is offered a best-of-breed approach to modeling business processes, thereby enhancing the overall customer experience. From the perspective of the local rule engine producer, seamless integration of third party rule engines may improve their market position as well, since BRMS providers may tailor their own products to enhance existing rule engine solutions.

Business rule engines, for example local rule engines, allow execution logic of a process to be modeled in a declarative and straightforward manner. By separating business related application logic from other application logic, for instance, organizations may achieve higher agility and flexibility, since changes to a business process may be implemented without changing the underlying programming logic.

A local rule engine may be caused to be capable of invoking a rule defined at an external rule engine, for example based on transmitting a schema document that defines an input to and an output of the external rule engine to the external rule engine. For instance, a rule engine vocabulary including a context description and a result description that respectively define an input to and an output of an external rule engine may be automatically generated, the rule engine vocabulary may be serialized in a schema document that, when received at the external rule engine, allows a rule to be defined based on the context description and the result description, and the schema document may be transmitted to the external rule engine. In doing so, a BRF is provided that defines a runtime and maintenance environment for the processing, implementation and configuration of technical and business rules.

In order to allow the local rule engine (or a component of the local rule engine) to access the BRMS, a function is modeled within the local rule engine to trigger the processing of the rule-based logic at the external rule engine through the use of a place-holding expression. Thus the function should be modeled or specified with data descriptions that can be understood by the external rule engines, so that appropriate data may be transmitted to the external rule engine based on a call to the function.

The vocabulary should thus include, for each of the expected context and result, a description including a data type of the expected context and result. For instance, the vocabulary may describe that an expected context (or input) may be a patient name of type ELEMENT_TEXT, or a patient identification number of type ELEMENT_NUMBER, or an expected treatment cost of type ELEMENT_CURRENCY. The expected result (or output) may be similarly described. Since the expected inputs and outputs of the function are known to the local rule engine system, the local rule engine system may automatically generate its own BV for export to the external rule engine by referencing the expected inputs and outputs of a particular function. Notably, since the vocabulary is based on a context provided during the design time phase, it is not necessary for the rule engines to derive templates or schemas based on past communication.

The context description may be data type that is native to the external rule engine. For instance, the vocabulary may be automatically generated using generic data objects, such as a field, structure, or table data objects. In doing so, the vocabulary may be used to specify the basic language constructs that define the universe of discourse between the local and external rule engines. In this regard, the vocabulary may be viewed as a published description of the intended format, type or structure of the context and the result that are to be communicated between the local rule engine and the external rule engine.

Furthermore, a connection may be defined as a placeholder EXTERNAL BRMS expression that allows the local rule engine to be seamlessly integrated with the external rule engine, using local rule engine-internal rule processing approaches. Since users of the local rule engine are not alerted to the external calls, complexity and integration costs are reduced.

The local rule engine may include generic expression subclasses such as the instance constant expression subclass, decision table expression subclass, a decision tree expression subclass, a formula expression subclass, and a function call expression subclasses, as well as the aforementioned EXTERNAL BRMS expression subclass that allows for communication between the local and external rule engines. The EXTERNAL BRMS expression subclass may include, for example an association to an abstract GENERIC BRMS CONNECTOR class that encapsulates parameters and function calls that are generally used to communicate with the external rule engine. The EXTERNAL BRMS expression instance is thus chosen, created, specified or otherwise defined within the expression tree at the local rule engine to connect the local rule engine to the external rule engine once the rule has been defined at the external rule engine.

Defining the expression may further include querying the rule engine to determine connection parameters, and selecting the defined expression from a list of possible expressions based on the determined connection parameters. The EXTERNAL BRMS expression subclass may include EXECUTE( ), CLOSE( ), and GETPARAMETERS( ) functions that allow the local rule engine to determine these connection parameters and distinguish between various external rule engine application platform subclasses, using reflecting programming. For example, using the GETPARAMETERS( ) function, a local rule engine may determine that the external rule engine uses a Java adapter, and may specify an EXTERNAL BRMS expression that implements a Java BRMS connector that encapsulates parameters and function calls used to communicate with a Java Adapter of the external rule engine.

Included in the schema document are the context and result definitions or descriptions that were automatically generated, so as to be provided to the external rule engine. Since the context or result may be an element, structure, table or other type of data, the schema document identifies which type of data the context or result is expected to be and provides a run-time XML element associated with the identified data type.

The schema document expresses a set of rules to which a document must conform in order to be considered 'valid' according to that schema. In this regard, other schema document languages or approaches, such as RELAX NG, or Document Type Definitions (DTDs), or Schematron may be substituted or used as an adjunct for an XSD. The vocabulary serialized in the schema document allows rules to be defined on the basis of the terms and relations encoded in the vocabulary.

The schema document is transmitted to the external rule engine. A rule is defined and tested at the external rule engine based on the context description and the result description included in the received schema document. When received at the external rule engine, the schema document allows a rule to be defined based on the context description and the result description. The schema document thus provides a basis for the definition of rules by the external rule engine.

The BV is derived from the local rule engine context, and is provided in a generic format in the schema document. From the BV, which is defined and provisioned during the design phase, the rule is defined by the BRMS during the design time phase and deployed for the runtime phase. Using the BV, the external rule engine uses an import function to link XML and Java templates by associating XSD entities and attributes, or by creating or updating templates corresponding to XSD entities, or attributes of such templates that corresponding to XSD attributes and that refer to nested entities (where no more than one may occur). Furthermore, the external rule engine may create or update templates representing any XSD relationships other than tree structure, concepts implemented by such templates and attributes, relations between such concepts as exist between the templates and their attributes that correspond to the imported schema documents, or verb phrasings for such relations.

Concepts, relations, and verb phrasings may be updated (not created), if an XML template is assigned. Therefore an initial provision of concepts, relations and verb phrasings may or may not occur using a default XSD-Import wizard.

Figure 3:
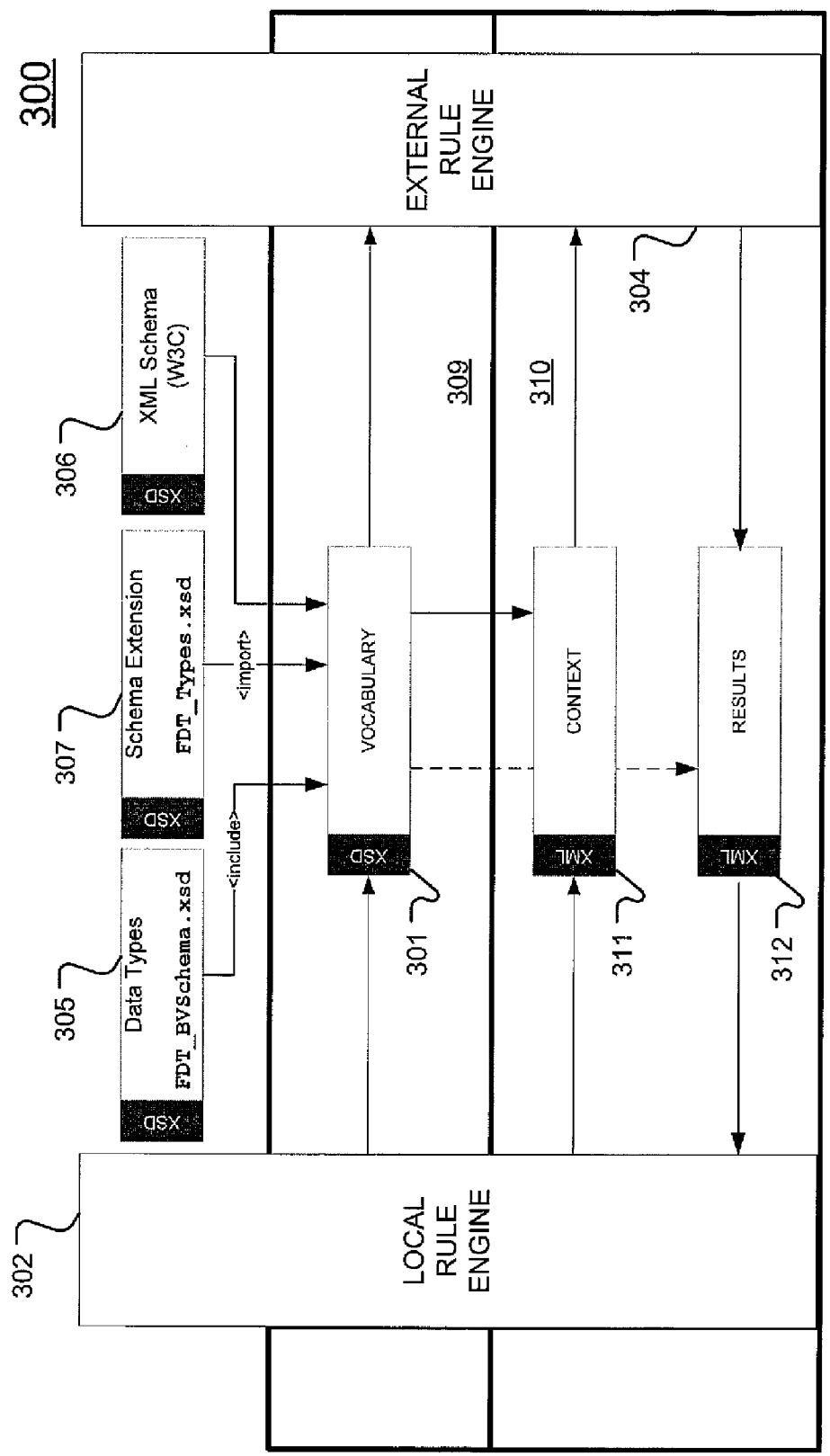
FIG. 3 illustrates the multiple layers associated with an exemplary schema document.

FIG. 3 illustrates the multiple layers associated with an exemplary schema document 301. Since the local rule engine 302 may pass various types of data to the external rule engine 304, such as proprietary data objects, generic or standardized data objects, or ABAP or other data objects, the schema document 301 should itself recognize each of these associated data objects in order to support a precise characterization of the associated data. In order to do so, the schema document 301 should include (via an <INCLUDE> element) a data type component 305 (FDT-BVSCHEMA.XSD) that specifies the types of data objects that the local rule engine is capable of communicating.

The schema document 301 should also incorporate standard components 306 (such as a W3C XML Schema), as well as a schema extension component 307 (FDT_TYPES.XSD) that extends the standard components 306 to specify a business context name and to define additional data constructs. The schema extension component 307 may be imported (via an <IMPORT> element) as a second namespace by the schema document 301. As indicated above, the schema document 301 is transmitted form the local rule engine 302 to the external rule engine 304 during a design time phase 309.

The schema document 301 is used as a basis for defining a rule at the external rule engine 304, where the rule is used during a run time phase 310 to process contexts 311 generated by the local rule engine 302 according to the vocabulary, and to output results 312. Thus, the local rule engine 302 may be caused to be capable of invoking the rule defined at the external rule engine 304 based on transmitting the schema document 301 that defines an input to and an output of an external rule engine 304 to the external rule engine 304, and vice versa.

Figure 4:
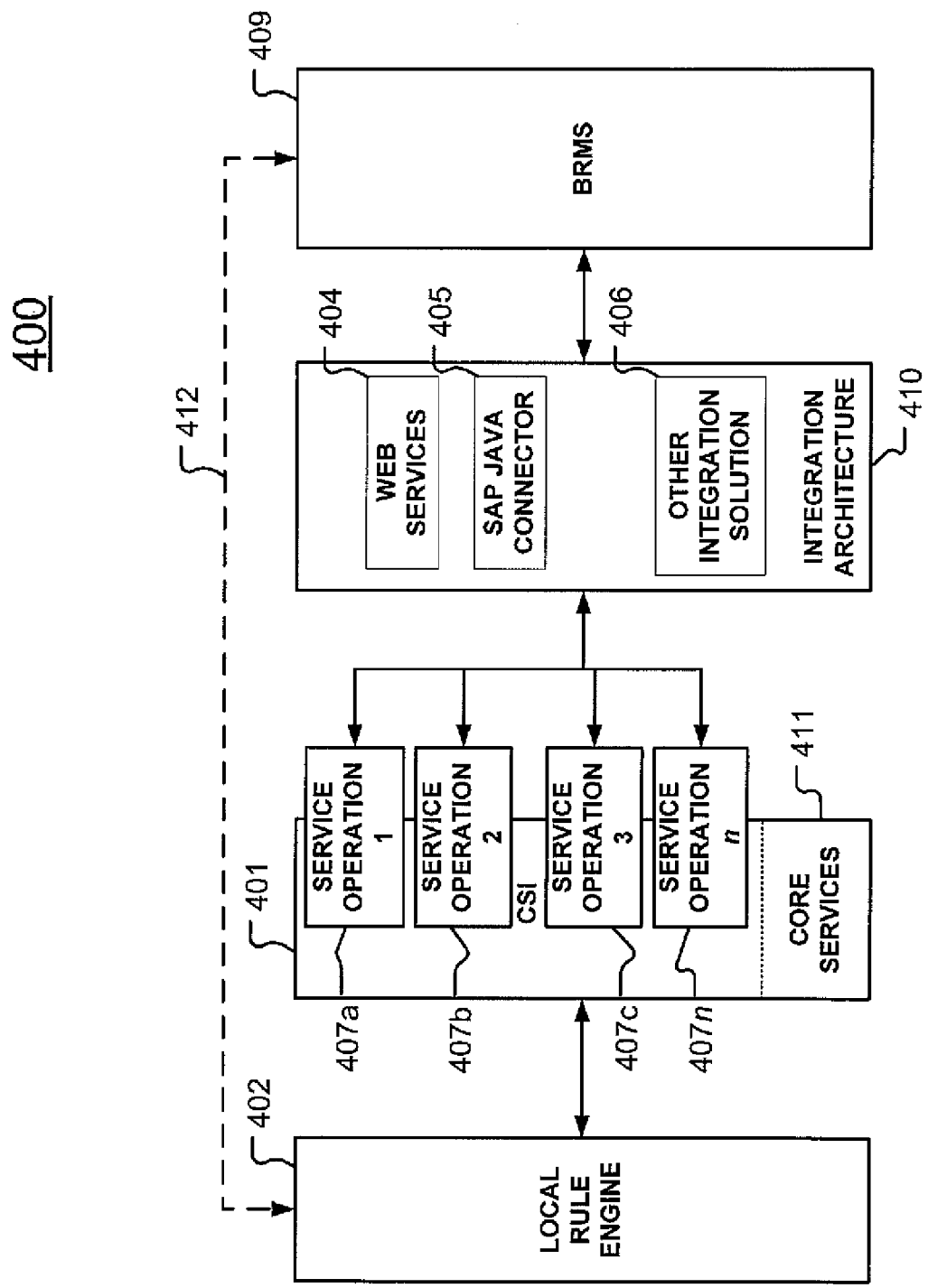

Returning to FIG. 2, a function provided by the local rule engine is exposed as a call-back service (S204). As shown in FIG. 4, the call-back service infrastructure ("CSI") 401 exposes a function of the local rule engine 402 as a web service 404 (as described by a WSDL), a Java connector ("JCO") 405, or other integration solution 406. In exposing the function, non-trivial service operations 407a to 407n (n representing any quantity) which orchestrate the tight interaction scenarios between the local rule engine 402 and a rule engine of the BRMS 409 are provided.

As described in further detail below, service operations 407 which may be provided by the CSI 401 may include (but are not restricted to) data look-up, data type look-up, unit conversion, log execution trace, backend function call, local rule engine call, or any other operation in which the BRMS accesses functionality or operations of the local rule engine 402 via the CSI 401.

Although interaction between the BRMS 409 and the local rule engine 402 is described herein using a web service based on SOAP calls, in other implementations other integration approaches may be used. As noted above, this robust integration architecture 410 includes the use of JCO 405 or any other integration solution 406. In addition to the elements and services depicted in FIG. 4, and depending upon a desired service configuration, interaction between the BRMS 409 and the local rule engine 402 may utilize a registration service.

Furthermore, the CSI 401 includes core services 411 that are used for managing the interaction of the BRMS 409 with the local rule engine 402. For instance, the core services 411 may provide a logging service which log details about a traceable interaction between the BRMS 409 and the local rule engine 402. Likewise, the core services 411 may provide an existing connection or metadata management service. As depicted by virtual connection 412, it is possible that interactions between the local rule engine 402 and the BRMS 409 may occur without the intervention of the CSI 401.

Returning to FIG. 2, a request to interact with the function is received at the call-back service from the external rule engine (S205) and, using the call-back service, an interaction is provided between the external rule engine and the function (S206) before the process 200 ends (S207). FIGS. 5 to 10, infra, describe several exemplary interactions, in which a BRMS transmits one or more requests to a local rule engine, and in which a response is transmitted in reply, via a call-back service.

Figure 5:
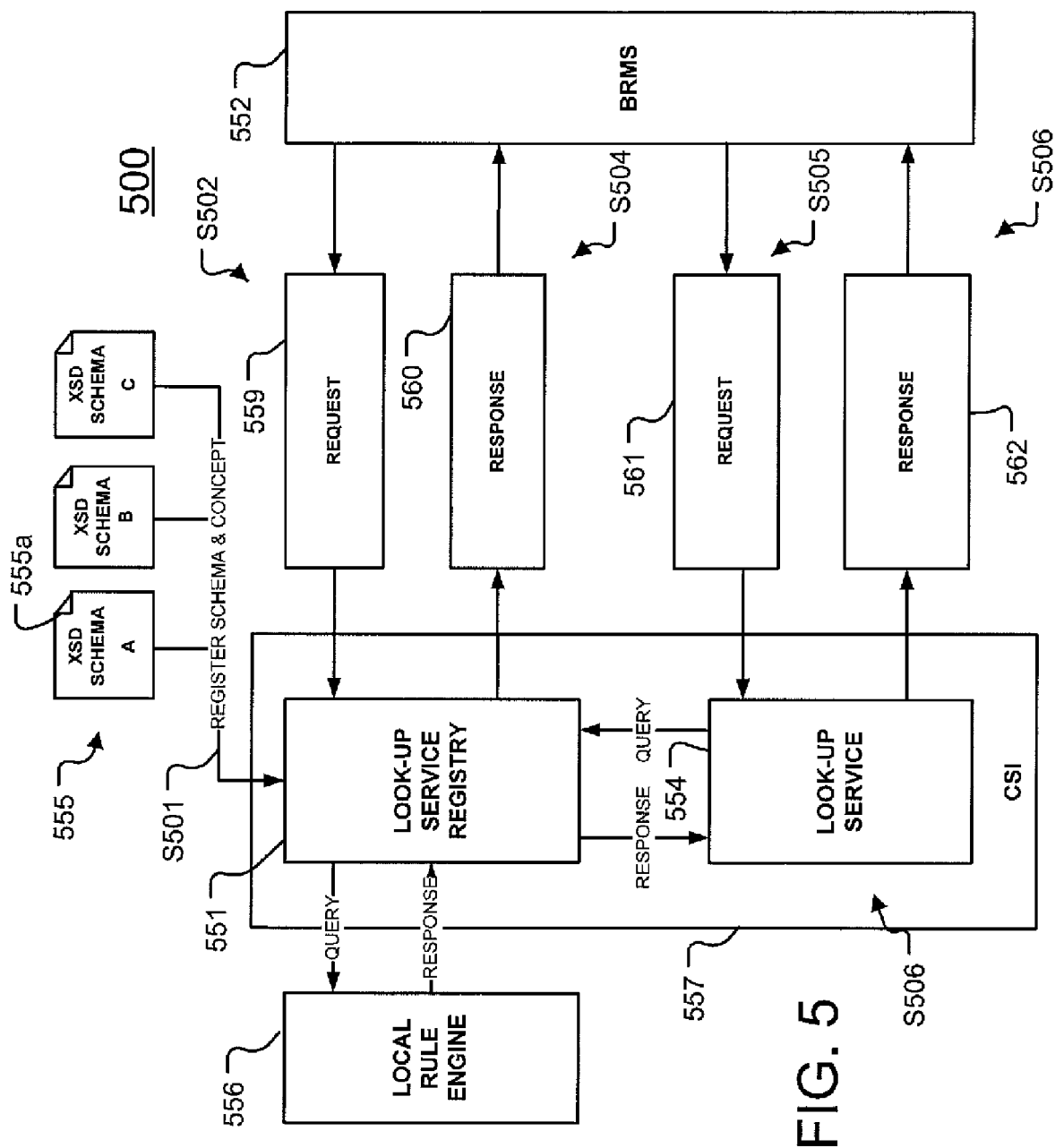
FIGS. 5 to 10 illustrate exemplary interactions.

FIG. 5 illustrates an exemplary look-up interaction (via a look-up service 554), in which a web service returns instance data associated with a type defined in a schema. Where the interaction refers to a look-up interaction, the look-up interaction may include registering a schema document binding the function with a data type, where the function may be a look-up function.

During a design time of the external rule engine, receiving the request to interact with the function may further include receiving a request for a list of look-up functions provided via the call-back service, and providing the interaction may further include transmitting, to the external rule engine, a response providing the list of look-up functions including the function. During a run-time of the external rule engine, receiving the request to interact with the function may further include receiving, from the external rule engine, a request for instance data, the request identifying the schema document, the function, and a parameter, and providing the interaction may further include transmitting, to the external rule engine, the instance data resulting from processing the request using the function.

Using a look-up interaction, instance data for a given data types may be queried, making it possible to sensitively load particular requested data during design-time and runtime without requiring the transport of all data associated with a data type to a BRMS. In addition to instance values, more complex descriptions (for instance from a data dictionary ("DDIC") or an enterprise service repository (ESR)) may be retrieved and transported to the BRMS.

Initially, look-up services are registered with a look-up service registry 551, so that the look-up interaction may occur (S501). This registration creates an internal binding for each data type, identifying a data source associated with the particular concept. By registering the look-up services, a BRMS 552 is provided with the ability to call the look-up service 554 during design-time or runtime.

Registration is provided using context descriptions included in XSD schemas 555 that reflect the basic data integration infrastructure between an local rule engine 556 and a BRMS 552. The binding may reflect, for instance that a data type PATIENT specified in 'XSD SCHEMA A' 555a includes a binding to a look up service capable of retrieving particular or desired instance values, based on a runtime query that specifies particular parameters. Different XSD schemas can bind the same data type in different ways, or to different look up services.

During a design-time, a user can query the look-up service registry 551 to provide a list of actual look-up services that may be used in a modeling process. Specifically, a SOAP request 559 may be sent from the BRMS 552 to the look-up service registry 551, requesting an indication of the data look-up services provided by the CSI 557 (S502). Further, the look-up service registry 551 may respond to the request 559 with a response 560 providing a list of look-up services (including the look-up service 554) provided by the CSI 554, that can be used as modeling entities in the BRMS 552 (S504).

The look-up service 554 may also be used directly in the BRMS 552 in order to query the local rule engine 556 for instance data, during runtime. In doing so, it is possible to model rules that use instance values of data objects specified in the XSD schema upon which the integration is based. For instance, a rule used by the BRMS 552 may compare two patients ("John Doe" and "Jane Doe") associated with the data type PATIENT, where the data type PATIENT is specified in the 'XSD schema A' 555*a*.

Similarly, a data look-up interaction may occur during runtime. Specifically, a SOAP request 561 may be sent from the BRMS 552 to the look-up service 554, referencing a registered schema, a concept or data type described in the registered schema, and additional parameters such as ranges (S505). The look-up service 554 may process the request 561, and may respond to the request 561 with a response 562 providing a list of instance values for a requested concept, or an error in case the concept is not registered (S506).

This look-up interaction allows the BRMS 552 to query the local rule engine 556 for additional data or specific data during the execution of a rule on the BRMS 552, without requiring the transfer of large amounts of data (such as entire patient treatment histories) in a call to the BRMS 552. As such, the data look-up functionality provided by the look-up service 554 may be used to receive queries and return data relating to the treatment history of a particular patient. Such queries may be initiated by statistical or other measures, such as when a rule executing on the BRMS 552 determines that insurance fraud may be occurring.

Figure 6:
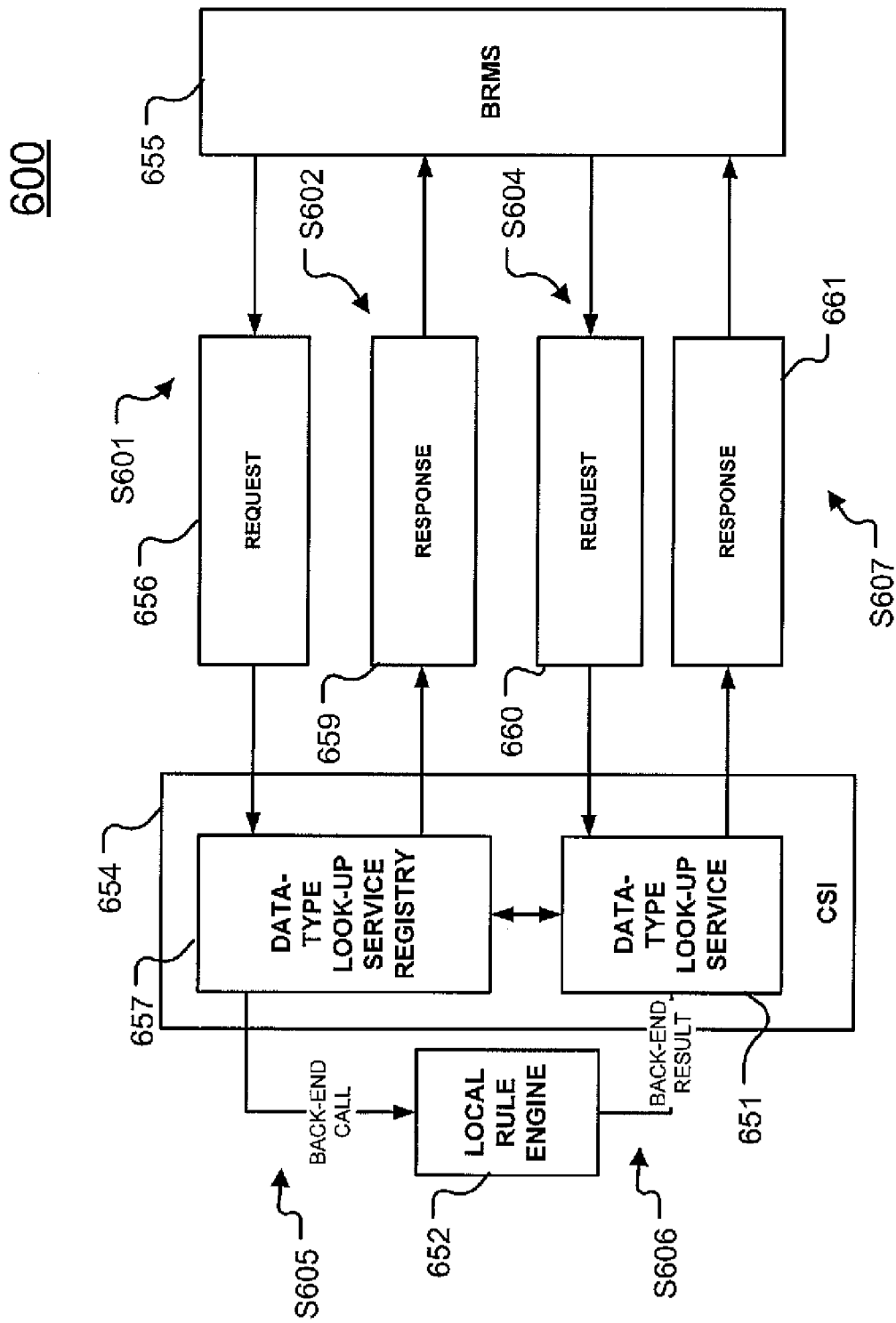

FIG. 6 illustrates an exemplary data type look-up interaction (via a data type look-up service 651), in which a web service returns a list of values or instances associated with a data type, such as a list of predefined values or identifiers associated with a currency or unit of measurement data type.

Where the interaction refers to a data type look-up interaction, the data type look-up interaction includes, during a design time of the external rule engine, receiving the request to interact with the function may further include receiving a request for a list identifying pre-defined data types used by the function, and providing the interaction further may further include transmitting, to the external rule engine, a response providing the list of pre-defined data types used by the function. During a run-time of the external rule engine, receiving the request to interact with the function further comprises receiving, from the external rule engine, a request for instance data associated with an identified data type on the list identifying pre-defined data types, and providing the interaction may further include transmitting, to the external rule engine, the instance data associated with the identified type.

The local rule engine 652 includes comprehensive, standardized lists of instances or values associated with pre-defined data types. For example, the currency data type may include instances representative of U.S. dollars, Euros, Japanese Yen, or other specified currencies, and a country data type may include instance representative of Germany, France, the United States, Canada, Australia, or other countries, or symbols, abbreviations or other indicia types corresponding to those countries. The CSI 654 provides the data type look-up service 651 that allows the BRMS 655 to load these lists during design time, so that the modeling capabilities may be aligned with those of the local rule engine 652 or other back-end system.

During a design time, the BRMS 655 sends a request 656, such as via a SOAP or API request, to the data-type look-up service registry 657 of the CSI 654 (S601), requesting a list of data types used by the local rule engine 652. The CSI 654 sends a response 659 to the request 656 back to the BRMS 655, where the response may be displayed to a user (S602). The response 659 includes a list of data types for which data-type look-up interaction is provided by the CSI 654, and further includes textual descriptions and identifiers that allow the user to select which data types they wish to import.

Upon selecting one or more data type lists, such as upon selecting a "currencies" data type list, the BRMS 655 sends a request 660 to the data-type look-up service 651 of the CSI 654, the request 660 including an identifier identifying a requested data type list (S604). The request 660 is received by the CSI 654 and passed on the local rule engine 652 (S604). The local rule engine compiles a result set that is passed back to the CSI (S606), where a response 661 listing the data types requested by the BRMS 655 is sent to the BRMS 655, processed and stored, such that the data type instances can be accessed during a modeling phase (S607).

Figure 7:
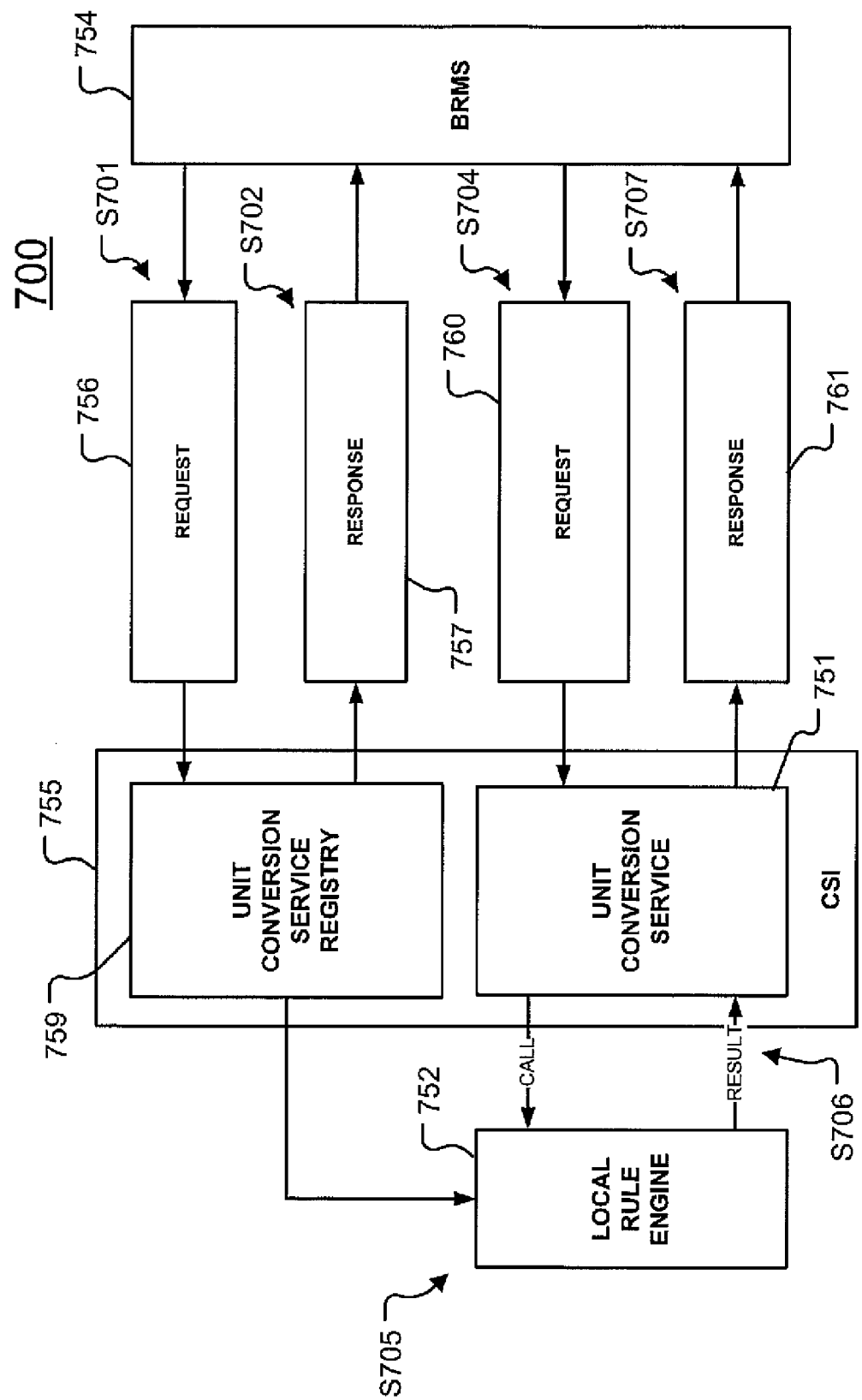

FIG. 7 illustrates an exemplary unit conversion interaction (via a unit conversion service 751), in which a web service provides for instance currency conversion, such as currency conversion that is subject to legal restrictions.

Where the interaction refers to a conversion interaction, the interaction includes, during a design time of the external rule engine, receiving the request to interact with the function may further include receiving a request for a list of conversion functions provided via the call-back service, and providing the interaction may further include transmitting, to the external rule engine, a response providing the list of conversion functions including the function. During a run-time of the external rule engine, receiving the request to interact with the function may further include receiving, from the external rule engine, a request for instance data, the request identifying the function, a source unit identifier, and a data value, and providing the interaction may further include transmitting, to the external rule engine, the instance data resulting from processing the request using the function.

The conversion of units, for instance the conversion of U.S. dollars to Euros, may be subject to legal regulations. For instance, varying conversion rules may be applied depending upon the context in which the conversion is being carried out, such as the country in which the conversion occurs or the currency or currencies being converted. Thus, may be useful to carry out a currency conversion in an enterprise system (such as local rule engine 752) that is configured or adapted to comply with particular regulations, rather than to process the currency conversion at an external rule engine 754.

The currency conversion interaction between the CSI 755 and the BRMS 754 begins when the BRMS 754 transmits a request 756 to a unit conversion service registry 759 for an indication of the unit conversion service capabilities provided by the CSI 755 (S701). A response 757 to the request 756 returns the service identifiers of services that provide such an interaction (including the unit conversion service 751), where the service identifier represents a concrete binding to a service that implements the conversion interaction and which can be used as a modeling entity in the BRMS 754 (S702).

During run-time, the BRMS 754 may halt its own rule execution and send a request 760 to the CSI 755 to invoke a currency conversion at the CSI 755, where the request 760 includes a target currency, a source currency, a data value to be converted, a reference to a run-time instance or service (S704). The reference to the actual run-time instance is transferred from the BRMS 754 to the CSI 755 so that the local rule engine 752 may determine the type of conversion to perform.

The request 760 is received by the CSI 755 and passed to the local rule engine 752, which effects the unit conversion (S705). The result of the conversion is transmitted back to the CSI 755 (S706), which prepares and sends a response 761 to the BRMS 754 (S707). The response 761 includes the conversion result and a reference to the run-time instance.

Using this type of currency conversion interaction, the BRMS 754 is not required to implement currency conversion functionality which is available in the local rule engine 752. By allowing the BRMS 754 to effect performance of this functionality at the local rule engine 752, requirements, such as requirements imposed by Sarbanes-Oxley legislation or by other accounting standards, may be satisfied using functionality available at the local rule engine 752 rather than the BRMS 754.

Figure 8:
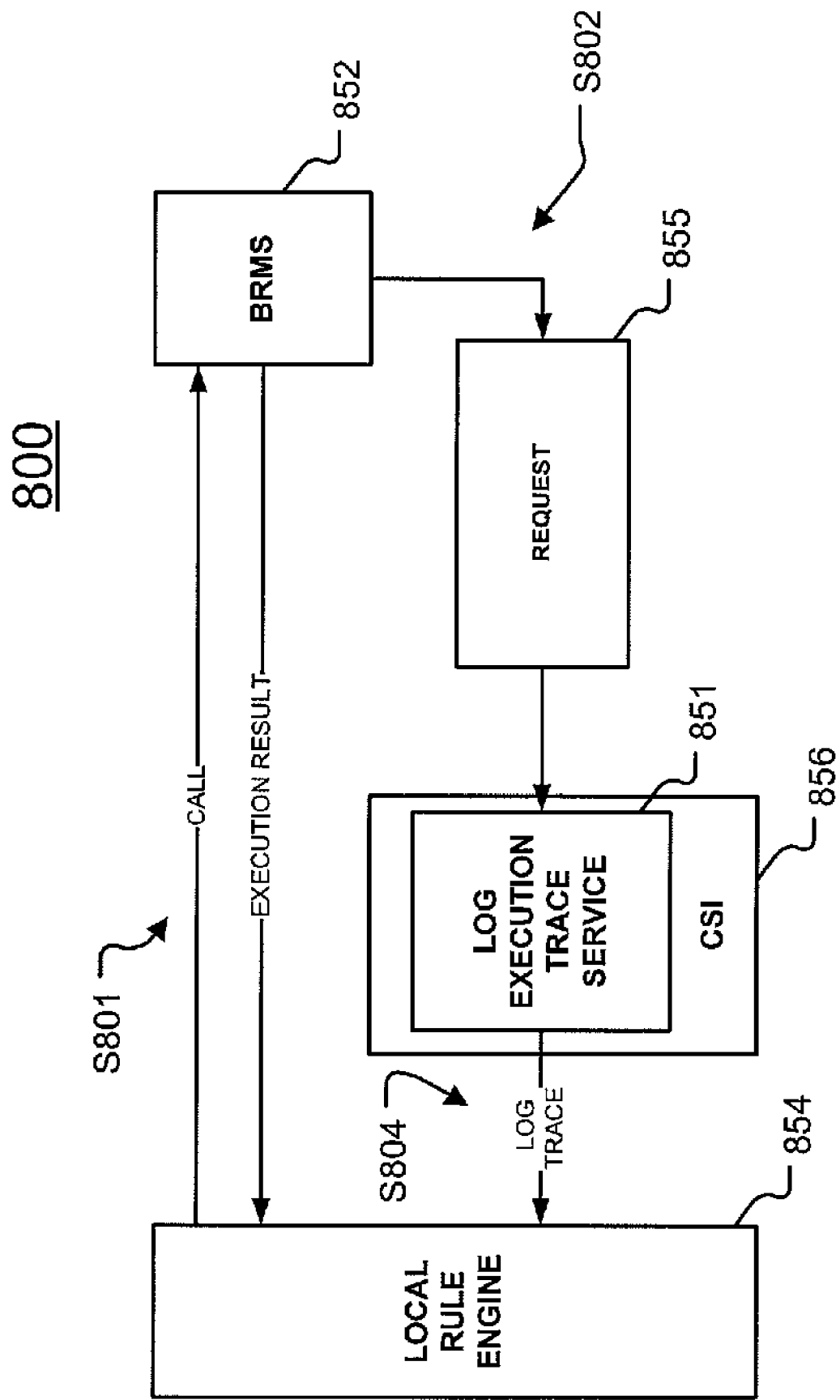

FIG. 8 illustrates an exemplary log execution trace interaction (via a log execution trace service 851), in which a web service receives an execution trace from a BRMS 852 and causes it to be stored in the local rule engine 854 in the backend. Where the interaction refers to a log trace interaction, the interaction includes, during a run-time of the external rule engine, receiving the request to interact with the function may include receiving, from the external rule engine, a request identifying a previously received call from the local rule engine to the external rule engine, and an execution trace logging execution of the call, and providing the interaction may further include storing the received execution trace at the local rule engine.

BRMS 852 may process data for which special auditing or security requirements apply. Thus, it may be useful to log the execution of rules in a way that allows subsequent auditing and reconstruction of processing results. Use of the log execution trace service 851 begins when a call to the BRMS 852 has been made during an execution time, and when the BRMS 852 has finished the execution of rules and send the result of the execution to the local rule engine 854 (S801). The BRMS 852 logs the execution in a text format.

The request 855 to log the execution trace is transmitted from the BRMS 852 to the log execution trace service 851, the request including the plain-text execution trace and an identifier of the call (S802). The log execution trace service 851 of the CSI 856 transmits the execution trace and identifier to the local rule engine 854, which stores the trace for future reference (S804). Call identifiers are created and maintained at the local rule engine 854 for every call, allowing the log execution trace to be unambiguously matched with the appropriate call when received.

Figure 9:
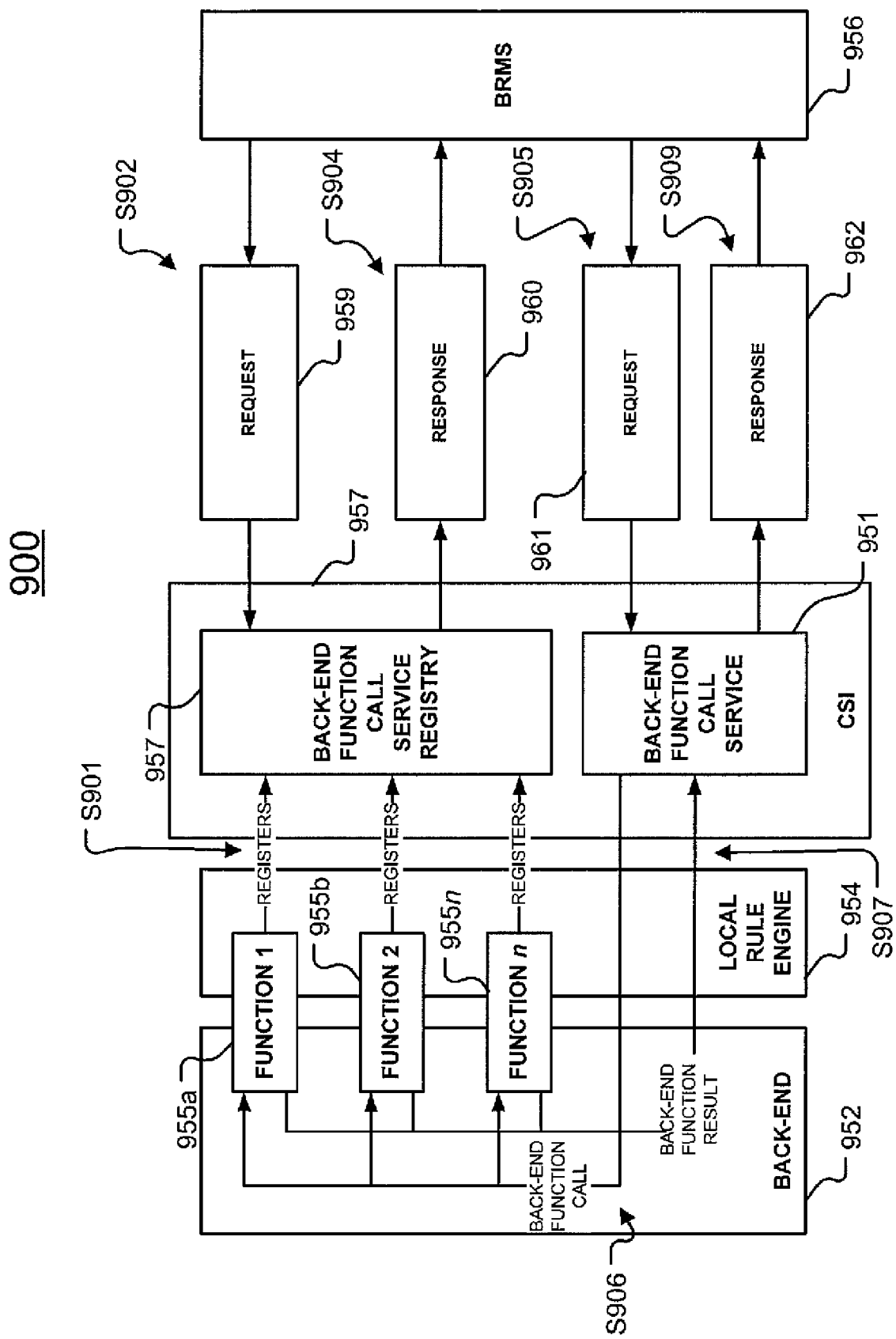

FIG. 9 illustrates an exemplary back-end function call interaction (via a back-end function call service 951), in which components of a back-end 952 that use an local rule engine 954 provide functions 955 to the local rule engine 954 which, for instance, allow the local rule engine 954 to perform a query for additional data. The back-end function call service 951 allows a BRMS 956 to access these functions 955 via the CSI 957.

Where the interaction refers to a back-end function interaction, the back-end function interaction may include registering the function with the call-back service, the function provided by the local rule engine comprises an internal local rule engine function or an external back-end function implemented by a back-end system. During a design time of the external rule engine, receiving the request to interact with the function may further include receiving a list of functions registered with the call-back service, and providing the interaction may further include transmitting, to the external rule engine, a response providing the list of functions including the external back-end function. During a run-time of the external rule engine, receiving the request to interact with the function may further include receiving, from the external rule engine, a back-end call, and providing the interaction may further include passing the back-end call to the back-end system, and transmitting, to the external rule engine, a response resulting from processing the back-end call using the external back-end function.

Internal components of the back-end 952 can expose functions 955 to the local rule engine 954, allowing the local rule engine 954 to access these functions 955 during the internal rule execution. These functions 955 may be integrated as expression types in the local rule engine's rule execution tree. The internal rule execution is suspended if a backend function call is reached during traversal of the local rule engine's execution tree. The backend function is called and the rule execution is resumed after the result of the call is received. Backend functions may, for instance, be used to query for additional data or to perform complex calculations. This interaction allows backend functions 955 can be exposed to and used by the BRMS 956.

Specifically, the back-end function call begins when the backend functions which are to be exposed to the BRMS 956 are made accessible via a registration operation (S901), in which a function (such as function 955a) registers itself with the back-end function call service registry 957. The BRMS 956 transmits a request 959 for a list of registered backend functions that are accessible to the BRMS 956 (S902), and a response 960 including a list of service identifiers is transmitted to the BRMS 956 in reply (S904). The service identifiers represent a concrete binding to a service which may be used as a modeling entity in the BRMS 956. The back-end functions or services may be used in the modeling environment of the BRMS 956, as independent entities.

During run-time, the BRMS 956 transmits a request 961 calling a back-end function (S905), and the call is passed to the requested function 955 in the back-end 952 (S906). A result of the back-end function is generated (S907), and the CSI 957 generates and transmits a response 962 returning the result to the BRMS (S909)

Figure 10:
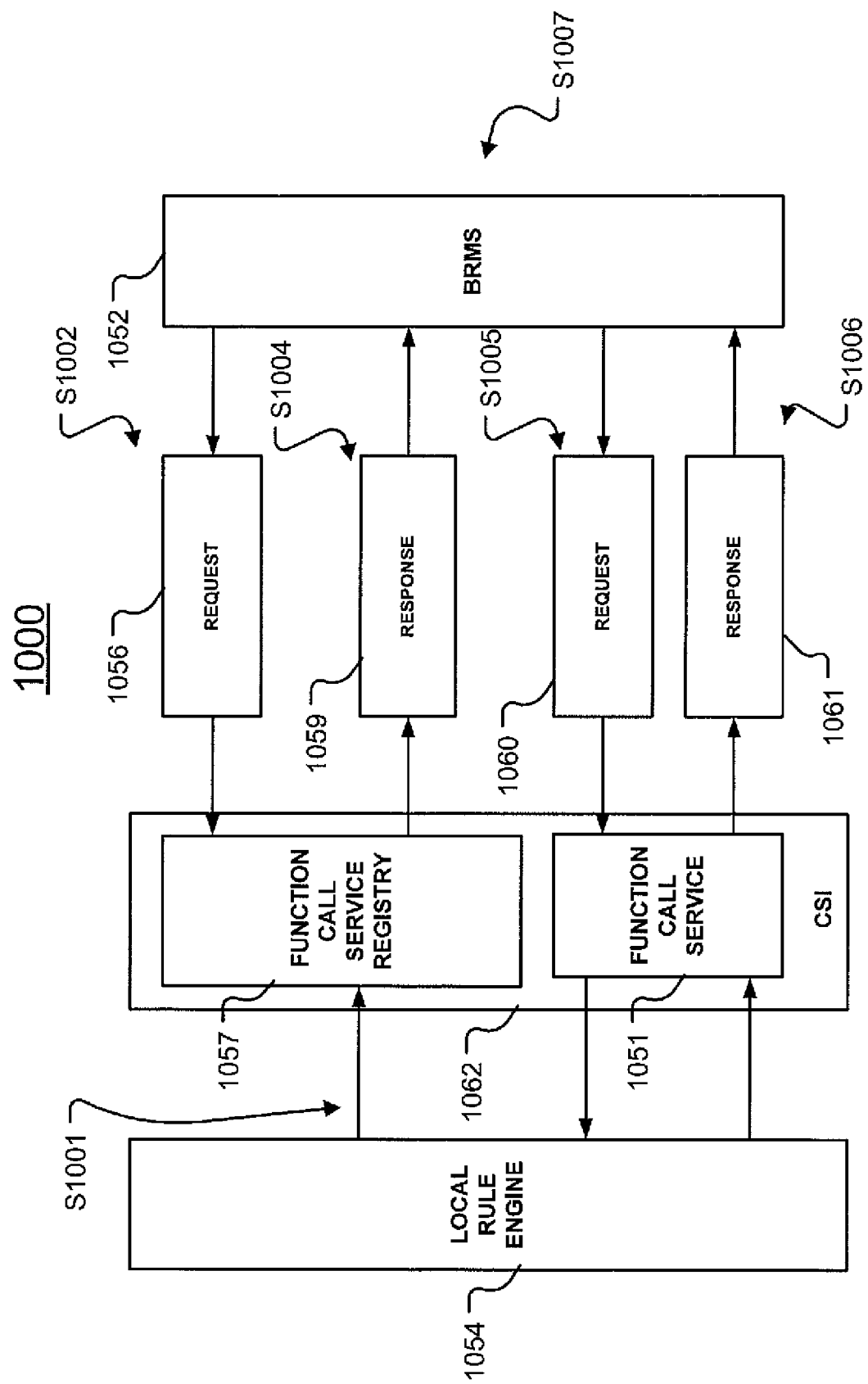

FIG. 10 illustrates an exemplary reverse call-back interaction (via a function call service 1051), in which a BRMS 1052 is enabled to call a local rule engine 1054, for the purpose of invoking execution of rules on the local rule engine 1054. Where the interaction refers to the reverse call-back interaction, the interaction may include, during a design time of the external rule engine, receiving the request to interact with the function may further include receiving a list of functions registered with the call-back service, and providing the interaction may further include transmitting, to the external rule engine, a response providing the list of functions including the internal local rule engine function. During a run-time of the external rule engine, receiving the request to interact with the function further comprises receiving, from the external rule engine, a local rule engine call, and providing the interaction may further include passing the local rule engine call to the local rule engine, and transmitting, to the external rule engine, a response resulting from processing the local rule engine call using the local rule engine function.

This reverse call-back interaction enables the BRMS 1052 to suspend its own rule execution in order to invoke the execution of an artifact in the local rule engine 1054, thereby inverting the normal, or forward call-back infrastructure. This interaction may be useful since the BRMS 1052 may itself be inflexible and incapable of performing certain functionalities, whereas the local rule engine 1054 may be developed with mass data processing use in mind. Thus, it may be desirable to mix or integrate the rule execution of both the BRMS 1052 and the local rule engine 1054, in order to capitalize on the strength and inherent advantages of each system.

Artifacts or functions modeled in the local rule engine 1054 that are to be exposed to the BRMS 1052 are made accessible via a registration operation (S1001). In doing so, these functions are made available to users of the BRMS 1052, which can transmit a request 1056 for a list of available local rule engine function call services (including a local rule engine function call service 1051)(S1002). The function call service registry 1057 transmits a response 1059, including a list of service identifiers, where each service identifier represents a concrete binding to a service that can be used as a modeling entity in the BRMS 1052 (S1004).

During a runtime, the BRMS 1052 suspends its rule execution, and transmits a request 1060 calling a function call service on the list of function call services (S1005), A response 1061 to the request 1060 is transmitted from the CSI 1062 including a result of the function call (S1006), and the BRMS 1052 resumes its rule execution using the result (S1007). Accordingly, arbitrarily nested calls are allowed between the BRMS 1052 and the local rule engine 1052.

Using this exemplary framework, the external rule engine may be loosely coupled to the local rule engine, and thus may not necessarily be capable of invoking functionality of the local rule engine. Furthermore, since other data transport mechanisms may require that all data to be processed by the external rule engine be transferred from the local rule engine to the external rule engine, which then should process and return a result to the dataset, the dataset and sends a result back, the data transport mechanism may not be feasible in cases where the amount of relevant data large.

Thus, the enhanced call-back approach allows for a tighter integration of external rule engines with the local rule engine. This advantage allows for the reduction of integration costs, and for new and extended use cases that previously could not be implemented.

Figure 11:
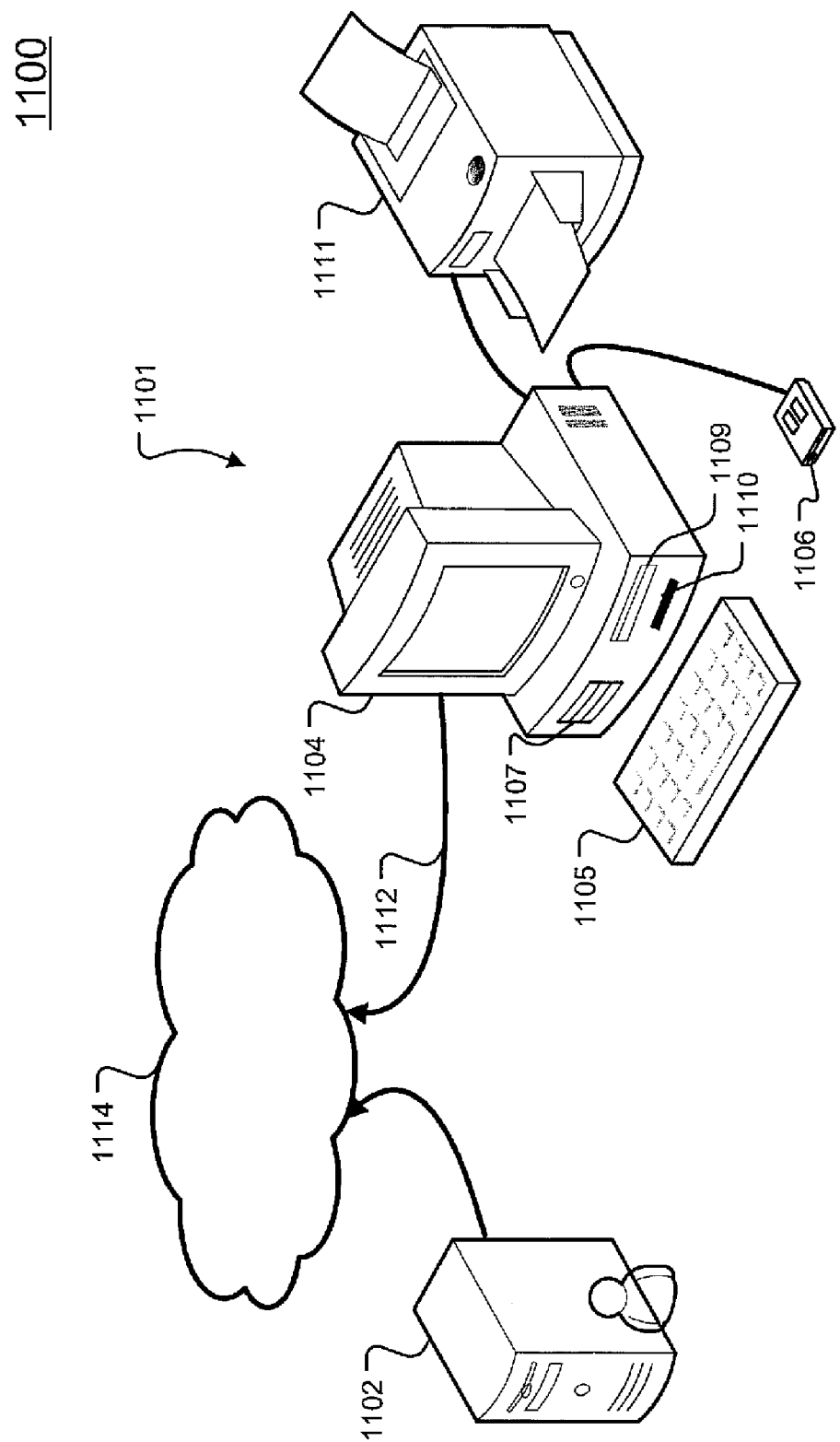
FIG. 11 illustrates an example of the exterior appearance of a computing device.

FIG. 11 illustrates the exterior appearance of an exemplary system 1100 that implements the enhanced rule engine, according to another general implementation. Briefly, the system 1100 includes a device 1101 that implements a local rule engine, and a BRMS 1102 that implements an external rule engine.

As is described in more detail, below, the device 1101 includes a processor, an interface, and an output module. The processor automatically generates a rule engine vocabulary including a context description and a result description that respectively define an input to and an output of an external rule engine, and serializes the rule engine vocabulary in a schema document that, when received at the external rule engine, allows a rule to be defined based on the context description and the result description. The interface transmits the schema document to the external rule engine, transmits a context specified according to the context description as the input to the external rule engine, for evaluation by the rule, and receives a rule-evaluated result specified according to the result description as the output of the external rule engine. The output module outputs the result.

In more detail, the hardware environment of the device 1101 includes a display monitor 1104 for displaying text and images to a user, a keyboard 1105 for entering text data and user commands into the device 1101, a mouse 1106 for pointing, selecting and adjusting objects displayed on the display monitor 1104, a fixed disk drive 1107, a removable disk drive 1109, a tape drive 1110, a hardcopy output device 1111, and a computer network connection 1112.

The display monitor 1104 displays graphics, images, and text that comprise the display for the software applications used by the device 1101, as well as the operating system programs necessary to operate the device 1101. A user uses the keyboard 1105 to enter commands and data to operate and control the computer operating system programs, the web browser, and/or the rule engine. The user uses the mouse 1106 to select and adjust graphics and text objects displayed on the display monitor 1104 as part of the interaction with and control of the device 1101 and applications running on the device 1101. The mouse 1106 is any type of pointing device, and may be a joystick, a trackball, a touch-pad, or other pointing device.

In a further implementation, the fixed disk drive 1107 itself may include a number of physical drive units, such as a redundant array of independent disks ("RAID"), or may be a disk drive farm or a disk array that is physically located in a separate computing unit. Such computer readable memory media allow the device 1101 to access computer-executable process steps, application programs and the like, stored on removable and non-removable memory media.

The wireless or wireline computer network connection 1112 may be a modem connection, a local-area network ("LAN") connection including the Ethernet, or a broadband wide-area network ("WAN") connection such as a digital subscriber line ("DSL"), cable high-speed internet connection, a power line communication ("PLC") connection, a dial-up connection, T-1 line, T-3 line, fiber optic connection, or satellite connection. The network 1114 may be one or more of a LAN network, a corporate or government WAN network, the Internet, or other network.

The computer network connection 1112 uses a wireline or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, a near field communications ("NFC") connector, an orthogonal frequency division multiplexing ("OFDM") ultra wide band ("UWB") wireless connector, a time-modulated ultra wide band ("TM-UWB") wireless connector, or other wireless connector. Example wireline connectors include, for example, a IEEE®-1394 FIREWIRE® connector, a Universal Serial Bus ("USB") connector, a serial port connector, a parallel port connector, or other wireline connector.

The removable disk drive 1109 is a removable storage device that is used to off-load data from the device 1101 or upload data onto the device 1101. The removable disk drive 1109 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, an external hard disk drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 1107 or on removable media for the removable disk drive 1109.

The tape drive 1110 is a tape storage device that is used to off-load data from the device 1101 or to upload data onto the device 1101. The tape drive 1110 may be a quarter-inch cartridge ("QIC"), 4 mm digital audio tape ("DAT"), 8 mm digital linear tape ("DLT") drive, or other type of tape.

The hardcopy output device 1111 provides an output function for the operating system programs and applications. The hardcopy output device 1111 may be a printer or any output device that produces tangible output objects, including textual or image data or graphical representations of textual or image data. While the hardcopy output device 1111 is depicted as being directly connected to the device 1101, it need not be. For instance, the hardcopy output device 1111 may be connected to device 1101 via a network interface, such as a wireline or wireless network.

Furthermore, although the device 1101 is illustrated in FIG. 11 as a desktop PC, in further implementations the device 1101 may be a laptop, a workstation, a midrange computer, a mainframe, an embedded system, telephone, a handheld or tablet computer, a PDA, or other type of device that includes a data processing apparatus.

Figure 12:
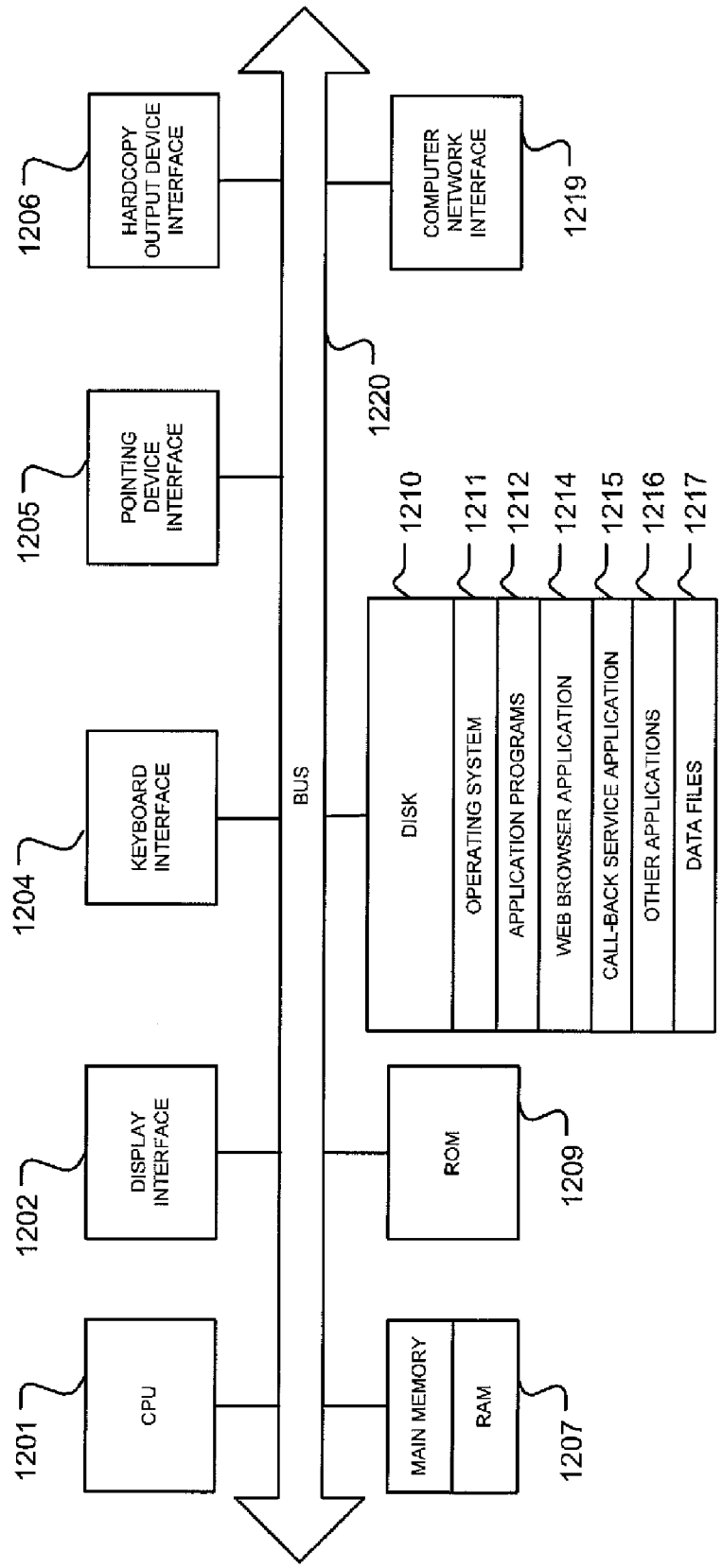
FIG. 12 is a block diagram illustrating the internal architecture of a computer shown in FIG. 11.

FIG. 12 is a block diagram illustrating the internal architecture of the computer shown in FIG. 11. Briefly, the computer includes a processor configured to cause a local rule engine to be capable of invoking a rule defined at an external rule engine, and to expose, as a call-back service, a function provided by the local rule engine. The processor is further configured to receive, at the call-back service and from the external rule engine, a request to interact with the function, and provide, using the call-back service, an interaction between the external rule engine and the function.

The computing environment includes a computer central processing unit ("CPU") 1201 where the computer instructions that comprise an operating system or an application are processed; a display interface 1202 which provides a communication interface and processing functions for rendering graphics, images, and texts on the display monitor 1104; a keyboard interface 1204 which provides a communication interface to the keyboard 1105; a pointing device interface 1205 which provides a communication interface to the mouse 1106 or an equivalent pointing device; a hardcopy output device interface 1206 which provides a communication interface to the hardcopy output device 1111; a random access memory ("RAM") 1207 where computer instructions and data are stored in a volatile memory device for processing by the computer CPU 1101; a read-only memory ("ROM") 1109 where invariant low-level systems code or data for basic system functions such as basic input and output ("I/O"), startup, or reception of keystrokes from the keyboard 1105 are stored in a non-volatile memory device; a storage medium 1210 or other suitable type of memory (e.g. such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 1211, application programs 1212 (including web browser application 1114, call-back service application 1215, and other applications 1216 as necessary) and data files 1217 are stored; and a computer network interface 1219 which provides a communication interface to the network 1114 over the computer network connection 1112. The constituent devices and the computer CPU 1201 communicate with each other over the computer bus 1220.

The call-back service application 1215 may be or may be compatible with an SAP® rule engine, a Workflow Magic rule engine, an OpenLexicon rule engine, an OpenRules rule engine, a NxBRE rule engine, a Rools rule engine, a JBoss Rules rule engine, or any other software system that helps manage and automate business rules.

Briefly, a computer program product is tangibly embodied in the machine-readable storage medium 1210. The computer program product includes instructions that, when read by a machine, operate to cause a data processing apparatus (such as the CPU 1201) to cause a local rule engine to be capable of invoking a rule defined at an external rule engine, to expose, as a call-back service, a function provided by the local rule engine, to receive, at the call-back service and from the external rule engine, a request to interact with the function, and to provide, using the call-back service, an interaction between the external rule engine and the function.

The RAM 1207 interfaces with the computer bus 1220 so as to provide quick RAM storage to the computer CPU 1201 during the execution of software programs such as the operating system application programs, and device drivers. More specifically, the computer CPU 1201 loads computer-executable process steps from the fixed disk drive 1107 or other media into a field of the RAM 1207 in order to execute software programs. Data is stored in the RAM 1207, where the data is accessed by the computer CPU 1201 during execution.

Also shown in FIG. 12, the device 1101 stores computer-executable code for a operating system 1211, and application programs 1212 such as word processing, spreadsheet, presentation, gaming, web browsing, JavaScript engine, or other applications. Although it is possible to provide for the enhanced call-back service using the above-described implementation, it is also possible to implement the functions according to the present disclosure as a dynamic link library ("DLL"), or as a plug-in to other application programs such as an Internet web-browser such as the APPLE® SAFARI® web browser or the MICROSOFT® INTERNET EXPLORER® web browser.

The computer CPU 1201 is one of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the computer CPU 1201 is more than one processing unit, including a multiple CPU configuration found in high-performance workstations and servers, or a multiple scalable processing unit found in mainframes.

The operating system 1211 may be APPLE® MAC OS X® for INTEL® and POWERPC® based workstations and servers; MICROSOFT® WINDOWS NT®/WINDOWS® 2000/WINDOWS® XP Workstation; MICROSOFT® WINDOWS VISTA®/WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers; SYM- BIAN OS®, NEWTON®, IPOD®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 1211 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT®.NET Compact.

While FIGS. 11 and 12 illustrate one possible implementation of a computing system that executes program code, or program or process steps, configured to effectuate an enhanced rule engine, other types of computers may also be used as well.

As to formal matters, while the term "user" has been consistently used to describe an entity that interacts with these processes, such a generalization is also intended to describe multiple related or unrelated, living or automated entities or beings that interact with these processes at various different, overlapping or non-overlapping states.

In a similar vein, the term "selection" is intended to denote throughout a manual selection by a human, an automatic selection by a non-human, or some combination thereof. Finally, it is noted that, for the sake of brevity, the terms "Java" and "JavaScript" are intended to reference the SUN MICROSYSTEMS® JAVASCRIPT® programming language, and the term "XML" is intended to reference 'eXtensible Markup Language' throughout.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
    transmitting, from a local rule engine to an external rule engine, a schema document that defines an input to and an output of the external rule engine, the schema document being used by the external rule engine to define a rule;
    exposing, as a call-back service, a function provided by the local rule engine, wherein the function is capable of invoking the rule defined at the external rule engine;
    receiving, at the call-back service and from the external rule engine, a request to interact with the function; and
    providing, using the call-back service, an interaction between the external rule engine and the function.

2. The method of claim 1, wherein the call-back service comprises a web service.

3. The method of claim 1, further comprising registering the schema document to bind the function with a data type, wherein the function comprises a look-up function.

4. The method of claim 3, wherein, during a design time of the external rule engine:
    receiving the request to interact with the function further comprises receiving a request for a list of look-up functions provided via the call-back service; and
    providing the interaction further comprises transmitting, to the external rule engine, a response providing the list of look-up functions including the function.

5. The method of claim 4, wherein, during a run-time of the external rule engine:
    receiving the request to interact with the function further comprises receiving, from the external rule engine, a request for instance data, the request identifying the schema document, the function, and a parameter; and
    providing the interaction further comprises transmitting, to the external rule engine, the instance data resulting from processing the request using the function.

6. The method of claim 1, wherein, during a design time of the external rule engine:
    receiving the request to interact with the function further comprises receiving a request for a list identifying pre-defined data types used by the function; and
    providing the interaction further comprises transmitting, to the external rule engine, a response providing the list of pre-defined data types used by the function.

7. The method of claim 6, wherein, during a run-time of the external rule engine:
    receiving the request to interact with the function further comprises receiving, from the external rule engine, a request for instance data associated with an identified data type on the list identifying pre-defined data types; and
    providing the interaction further comprises transmitting, to the external rule engine, the instance data associated with the identified type.

8. The method of claim 1, wherein the function comprises a conversion function.

9. The method of claim 8, wherein, during a design time of the external rule engine:
    receiving the request to interact with the function further comprises receiving a request for a list of conversion functions provided via the call-back service; and
    providing the interaction further comprises transmitting, to the external rule engine, a response providing the list of conversion functions including the function.

10. The method of claim 9, wherein, during a run-time of the external rule engine:
    receiving the request to interact with the function further comprises receiving, from the external rule engine, a request for instance data, the request identifying the function, a source unit identifier, and a data value; and
    providing the interaction further comprises transmitting, to the external rule engine, the instance data resulting from processing the request using the function.

11. The method of claim 1,
    wherein the function comprises a log execution trace function; and
    wherein, during a run-time of the external rule engine:
        receiving the request to interact with the function further comprises receiving, from the external rule engine, a request identifying a previously received call from the local rule engine to the external rule engine, and an execution trace logging execution of the call, and
        providing the interaction further comprises storing the received execution trace at the local rule engine.

12. The method of claim 1, further comprises registering the function with the call-back service,
    wherein the function provided by the local rule engine comprises an internal local rule engine function or an external back-end function implemented by a back-end system.

13. The method of claim 12, wherein, during a design time of the external rule engine:
    receiving the request to interact with the function further comprises receiving a list of functions registered with the call-back service; and
    providing the interaction further comprises transmitting, to the external rule engine, a response providing the list of functions including the external back-end function.

14. The method of claim 13, wherein, during a run-time of the external rule engine:

receiving the request to interact with the function further comprises receiving, from the external rule engine, a back-end call; and providing the interaction further comprises:
  passing the back-end call to the back-end system, and
  transmitting, to the external rule engine, a response resulting from processing the back-end call using the external back-end function.

15. The method of claim 12, wherein, during a design time of the external rule engine:

receiving the request to interact with the function further comprises receiving a list of functions registered with the call-back service; and providing the interaction further comprise transmitting, to the external rule engine, a response providing the list of functions including the internal local rule engine function.

16. The method of claim 15, wherein, during a run-time of the external rule engine:

receiving the request to interact with the function further comprises receiving, from the external rule engine, a local rule engine call; and providing the interaction further comprises:
  passing the local rule engine call to the local rule engine, and
  transmitting, to the external rule engine, a response resulting from processing the local rule engine call using the local rule engine function.

17. A device comprising a processor configured to:
transmit, from a local rule engine to an external rule engine, a schema document that defines an input to and an output of the external rule engine, the schema document being used by the external rule engine to define a rule;
expose, as a call-back service, a function provided by the local rule engine, wherein the function is capable of invoking the rule defined at the external rule engine;
receive, at the call-back service and from the external rule engine, a request to interact with the function; and
provide, using the call-back service, an interaction between the external rule engine and the function.

18. A computer program product, tangibly embodied in a machine-readable medium, the computer program product comprising instructions that, when read by a machine, operate to cause data processing apparatus to:
transmit, from a local rule engine to an external rule engine, a schema document that defines an input to and an output of the external rule engine, the schema document being used by the external rule engine to define a rule;
expose, as a call-back service, a function provided by the local rule engine, wherein the function is capable of invoking the rule defined at the external rule engine;
receive, at the call-back service and from the external rule engine, a request to interact with the function; and
provide, using the call-back service, an interaction between the external rule engine and the function.

* * * * *